United States Patent [19]

Steimel et al.

[11] Patent Number: 4,874,541
[45] Date of Patent: Oct. 17, 1989

[54] ALL-IN-ONE BOILER WATER TREATMENT COMPOSITION

[75] Inventors: Lyle H. Steimel, Forest Park; Ronald J. Christensen, Montgomery, both of Ohio

[73] Assignee: DuBois Chemicals, Inc., Cincinnati, Ohio

[21] Appl. No.: 204,861

[22] Filed: Jun. 10, 1988

Related U.S. Application Data

[63] Continuation of Ser. No. 133,504, Dec. 16, 1987, abandoned.

[51] Int. Cl.$^4$ ................................................. C02F 5/12
[52] U.S. Cl. ...................................... 252/178; 252/81; 252/181
[58] Field of Search .......................... 252/81, 178, 181

[56] References Cited

U.S. PATENT DOCUMENTS 4,549,968 10/1985 Muccitelli ............................ 210/750
4,681,737 7/1987 Walker et al. ........................ 422/16

FOREIGN PATENT DOCUMENTS 1168950 6/1984 Canada .
1186425 4/1985 Canada ................................ 252/178

*Primary Examiner*—Robert A. Wax
*Attorney, Agent, or Firm*—Wood, Herron & Evans

[57] ABSTRACT

An all in one boiler water treatment composition includes an oxygen scavenging system, an alkalinity control agent such as sodium carbonate, diethylaminoethanol as a condensate treatment, a polymer system including polymethacrylate or polyacrylate and polymaleic acid along with an oxygen scavenging system. The oxygen scavenging system includes the diethylaminoethanol, a polyhydroxy acid and a sulfite.

6 Claims, No Drawings

ALL-IN-ONE BOILER WATER TREATMENT COMPOSITION

This is a continuation of application Ser. No. 133,504, filed 12/16/87, now abandoned.

BACKGROUND OF THE INVENTION

A boiler requires extremely pure water in order to avoid a plurality of different problems. Unfortunately water available for most boilers is not pure enough to avoid these problems. Untreated water would rapidly damage the boiler eventually destroying it.

Currently there are a variety of different physical and chemical treatments for boiler water. BOILER WATER TREATMENT an article from the magazine Power, June, 1987, p. S1-S16 describes many of these different treatments. Further, "Chemical Treatment Options For Steam Generation" in the same magazine February of 1982, p. 93-97 discusses similar treatments and solutions. Some of the problems defined by these papers are scale, pH, pitting by oxygen and carbonic acid formed from carbon dioxide.

Phosphates are typically used as an internal treatment for scale prevention in boilers. Basically this forms a sludge that is easily removed. Other scale preventers includes low molecular weight polymers generally in combination with phosphates and the like. Polymethacrylates and polyacrylates having molecular weights around 4500 have also been used for scale. These act not only to prevent scale formation but also in certain applications can act as descalants. Polymaleic acid is also employed.

Oxygen pitting is typically solved by removal of oxygen in the make-up water. A large amount of oxygen dissolved in water can be removed by physical treatment, dearation. Subsequent chemical treatment by oxygen scavengers is then required to remove the last traces of oxygen. There are several different oxygen scavengers. Hydrazine is a commonly employed scavenger. Unfortunately generated steam containing hydrazine is unsuitable for applications where the steam may contact food. Other less dangerous chemicals typically used include sulfites such as sodium sulfite and erythorbic acid. The use of this composition is disclosed for example in U.S. Pat. No. 4,419,327. It is also known to use ascorbic acid but this treatment is not commonly employed.

There are various volatile amines which have been used for condensate treatment. These include ammonium hydroxide which is incompatible with any kind of copper surface. Cyclohexylamine has been used but is not compatible with a highly alkaline carbonate system. Morpholine exhibits a low distribution ratio and would protect the short steam system however medium to long condensate lines would not be protected. Octadecylamine is a filming amine and diethylaminoethanol is another amine used to treat condensate systems.

Other chemicals used to treat boiler water include sodium hydroxide which increases alkalinity and precipitates magnesium, sodium carbonate which also increases alkalinity and precipitates calcium, and magnesium, chelants such as ethylenediaminetetraacetic acid, tannins, starches, lignins, carboxymethylcellulose which prevents feed line deposits, sodium nitrate which inhibits caustic embrittlement and antifoaming agents.

These many different chemical treatment agents are generally applied separately at separate locations along the boiler system. Incompatibility of concentrated solutions of these treatment agents has generally prevented formulation of all-in-one treatments which would be stored and shipped in concentrated form and applied at use dosages.

SUMMARY OF THE INVENTION

The present invention is premised on realization that such an all-in-one treatment composition can be formulated which provides a balanced scale prevention and removal, sludge treatment, oxygen scavenging, metal passivation, condensate treatment as well as iron and magnesium control. These can be provided at high concentrations for storage and application and are effective at use concentrations.

The composition of the present invention includes an alkalinity control agent, condensate treatment particularly diethylaminoethanol, oxygen scavengers particularly sodium sulfite and a polyhydroxy acid. Further, the composition includes a polymer system including a water soluble polymethacrylate and a water soluble polymaleic acid, both neutralized in this system.

The present invention will be further appreciated in light of the following detailed description.

DETAILED DESCRIPTION OF THE INVENTION

The present invention is a carbonate cycle treatment composition which includes an oxygen scavenging system, a condensate treatment, a hardness and scale prevention and removal system as well as an iron control agent. These are mixed and stored as a concentrated aqueous mixture and added to the boiler water to provide effective treatment.

The following description provides the desired use concentrations of each component of this system. The all-in-one treatment composition is formed by adding concentrated forms of these components at relative concentrations so that the formulated treatment composition can be dispensed into the boiler water and attain the desired use concentrations for all of these components. The actual amount of each chemical added to the concentrated formulations depends on the precise intended use concentrations and the concentration of each chemical when purchased.

The oxygen scavenging/condensate control mechanism is a three component system. The system includes a sulfite, a polyhydroxy acid and diethylaminoethanol. Effective sulfites include sodium and potassium sulfite and sodium and potassium bisulfite. The use concentration of sodium or potassium sulfite should range from about 20 to about 60 ppm. Since the sulfite is consumed, the concentrated solution will include a slight excess of sulfite, generally 45 to 90 ppm is applied.

The polyhydroxy acid is a water soluble acid preferably erythorbic acid or ascorbic acid. Ascorbic acid is preferred over erythorbic acid since it acts synergistically with the diethylaminoethanol to provide effective oxygen scavenging.

The concentration of polyhydroxy acid should be from about 1 to about 40 parts per million. Again, ascorbic acid is consumed in the boiler. So a slight excess is applied generally up to 100 ppm with 10-20 ppm preferred. Sufficient DEAE is provided to neutralize the acid and to provide a condensate pH of 7.5-8.5. To provide both condensate treatment and neutralization of the acid generally 1-200 ppm DEAE is required. Preferably the use concentration will be 25 to 50 ppm. If no condensate treatment is necessary, the DEAE need not be included.

The hardness control is provided through three components. The first of these components is sodium carbonate or potassium carbonate which reacts with the hardness to form calcium carbonate which can easily be removed. For use in the present invention, there should be from about 20 to about 500 parts per million of potassium or sodium carbonate. Some carbonate can be provided by the natural water so slightly less carbonate is applied. Thus, the applied concentration should range from 0 ppm to 500 ppm.

In addition to this, a first and a second low molecular weight polymer should be employed. The first polymer is preferably the sodium neutralized salt of polymethacrylate or polyacrylate having a molecular weight of from 500 to 5000. The second polymer is preferably a polymaleate having a molecular weight of from 500 to 1000.

The polymethacrylates and polyacrylates can be obtained in a wide range of molecular weights, but generally the molecular weight should range from 500 to 5000 with 4500 being preferred. The most preferred is polymethacrylate having a pH of about 11.5 with a molecular weight of about 4500. This is employed at about 1 to 80 parts per million with 12-24 ppm being preferred.

The polymaleate is added as polymaleic acid and is neutralized in the solution to form the corresponding sodium or potassium polymaleate. The polymaleate can have a molecular weight generally from about 500 to 1000 with 750 being the preferred molecular weight. This is used at a concentration of 1 to 80 parts per million with about 5-10 parts per million being preferred.

The composition of the present invention can optionally include a sodium or potassium glucoheptonate to transport iron out of the system. This would be used at a range of 0 to 10 parts per million with 1-2 parts per million being preferred.

The composition will also include a water soluble base generally sodium or potassium hydroxide if needed to bring the pH of the boiler water to about 11-11.5. Generally the concentrate will include 10-15% sodium hydroxide depending on the pH of the make up water in the boiler.

Generally the concentrated form of this treatment composition includes as actives by weight
DEAE: 0 to 15%
Polymaleate: 0.1 to 4%
Polymethacrylate: 0.1 to 4%
Polyhydroxy acid: 0.1 to 5%
Soda Ash: 0 to 7%
Sulfite: 1 to 14%
Glucoheptonate: 0 to 0.2%
Water soluble base: 0 to 15%
Water: to 100%
Where the condensate treatment is needed, at least 0.1% DEAE should be present in the concentrate.

The preferred formulation is
Water: 77.6%
Sodium hydroxide: 8.5%
DEAE: 2.6%
Polymaleate: 0.5%
Polymethacrylate: 1.2%
Ascorbic Acid: 0.5%
$Na_2CO_3$: 4.5%
Sodium Sulfite: 4.5%
Sodium Glucoheptonate: 0.1%

This concentrated formulation is formed by simply mixing the components.

The boiler water composition of the present invention is used at the above use concentrations. In its concentrated form, it is generally about 80-90% water. It is dispensed periodically to the boiler water to provide the concentrations as listed above. Generally 1000 to 2000 ppm of this formulation is added to and maintained in the boiler. This treatment is useful in low pressure applications generally in boilers operating at less than 250 psi.

The present invention will be further appreciated in light of the following detailed examples wherein a boiler water treatment composition having the preferred formulated as tested previously listed was used in field tests to treat the boilers as described below.

EXAMPLE 1

The above preferred formulation was used to treat three five hundred horse power boilers having a 50% condensate return operating at 12 psi with continuous blow down. The make up water has an M alkalinity as $CaCO_3$ of 52 mg/l, a total hardness as $CaCO_3$ of less than 1 mg/1, chloride at 25 mg/l, sulfate at 89 mg/l and a conductance of 378 with a pH of 7.2. The water conditions of the steam boiler and condensate from week 1 to week 8 were as follows:

TABLE I

| Date | Makeup Dosage mg/l | Cycles | % Condensate Return | Condensate pH | Fe mg/l | lb. $SO_3$ | Treatment Composition |
|---|---|---|---|---|---|---|---|
| Week 1 Day 1 | 647 | 3.77 | 86% | 8.3 | 0.05 | 1.5 | 1 qt. |
| Week 3 Day 3 | 683 | 3.4 | 91% | 8.1 | 0.6 | ¼ | 1 qt. |
| Week 5 Day 2 | 319 | 3.8 | 73.6% | 8.4 | 0.03 | 0 | 1 qt. |
| Week 6 Day 2 | 303 | 6.17 | 90% | 8.4 | 0.01 | 2 | 1 qt. |
| Week 8 Day 2 | 326 | 6.9 | 75% | 8.3 | .05 | | |

Conclusion

The boiler treatment composition of the present invention maintained a very high condensate pH and boiler sulfite residual. The maximum pH the equipment could test at was 8.3 to 8.4. This pH is met and in most applications exceeded with this treatment program.

EXAMPLE 2

A 150 horsepower Cleaver Brooks boilers was tested operating at 90 psi with no continuous blow down. Dual tank softeners were employed. The boiler operates one hour per day on hard water. Prior to use of the present invention the boiler included ¼ to ⅜ inch scale deposits over the entire tube surface. Iron oxide in the hematite state covered over 50% of the surface. The scale consisted of 13.2% iron as $Fe_2O_3$, 39.6% calcium as CaO, 13.5% silica as $SiO_2$, 25.0% phosphate as $P_2O_5$, and 4.7% carbonate. The make up water in this system had an M alkalinity as $CaCO_3$ of 152 mg/l, a total hardness as $CaCO_3$ of less than 1 mg/l 23 hours per day and 80 mg/l for one hour a day, the cloride was 28 mg/l and silica as $SiO_2$ of 0.3 mg/l. The sulphate as $SO_4$ was 70 mg/l and conductance was 490 with a pH of 8.2. The conditions of the steam boiler and condensate from week 1 to week 8 were as follows:

TABLE II

| Date | Makeup Dosage mg/l | Cycles | % Condensate Return | Condensate pH Hot | Condensate pH Cold | $CO_2$ mg/l | Fe mg/l |
|---|---|---|---|---|---|---|---|
| Week 1 Day 1 | 141 | 14 | 60 | | 5.1 | | 0.13 |
| Week 2 Day 3 | 147 | 12.2 | 60 | | 5.1 | | 0.44 |
| Week 6 Day 2 | 272 | 15 | 42% | | 7.54 | | 0.17 |
| Week 8 Day 3 | 290 | 20.2 | 33.3% | | 6.8 | | 0.12 |

The treatment of the present invention raised the pH from 5.1 or less to a pH of 7.5 in a long condensate system typical of a hospital. The good pH readings along with poor control of the cycle of concentrations indicate that if the system were better controlled the pH readings would be excellent to great. The present invention did a good job in a system with an excess of 150 M alkalinity at 90 psi.

EXAMPLE 3

The above composition was used on a 100 horsepower North America boiler having a condensate sample cooler. There was no continuous blow down and a single tank softener generally less than 2 parts per million total hardness. Prior to the test this boiler had a low condensate pH generally less than 5. The make up water had an M alkalinity as $CaCO_3$ of 95 mg/l, a total hardness as $CaCO_3$ of less than 1 mg/l, chloride 23 mg/l, silica as $SiO_2$ 6 mg/l, sulphate as $SO_4$ 6 mg/l, TDS 360 mg/l and pH 7.4. The water conditions of the steam boiler and condensate from week 1 to week 8 were as follows:

TABLE III

| Date | Makeup Dosage mg/l | Cycles | % Condensate Return | Condensate pH Hot | Condensate pH Cold | $CO_2$ mg/l Hot | $CO_2$ mg/l Cold | Fe mg/l |
|---|---|---|---|---|---|---|---|---|
| Week 1 Day 1 | 287 | 7.8 | 8.6% | 7.3 | 5.3 | 5 | 22 | 0.55 |
| Week 2 Day 2 | 102 | 8.4 | | 9.0 | 5.7 | 0 | 27 | .20 |
| Week 6 Day 5 | | | 28% | 8.1 | 7.75 | 0 | 5 | |
| Week 7 Day 4 | | | 25% | 8.3 | 7.0 | 0 | 4.4 | |
| Week 8 Day 6 | 300 | | 40% | 8.3 | 7.57 | 0 | 3.2 | .12 |

The composition of the present invention did an excellent job in raising the condensate pH from 5.3 to over 7.7 and lowering the free $CO_2$ to less than 3 mg/l.

These examples demonstrate the effectiveness of the present invention over a wide range of make up water composition and equipment. Further the present invention is stable at higher concentrations making it useful as an all-in-one treatment composition for boiler water.

The above description has been a description of the practicing of the present invention along with the best mode known of practicing the invention. The description is not intended to be a limiting description.

The present invention is limited only by the appended claims wherein we claim:

1. A concentrated all-in-one boiler water treatment composition consisting of
   Glucoheptonate: 0% to 0.2%
   Sulfite: 0.1% to 14%
   Polyhydroxy acid: 0.1 to 5%
   Diethylaminoethanol: 0.0 to 15.0%
   1st polymer: 0.1 to 4%
   Polymaleate: 0.01 to 4%
   Carbonate: 0 to 7%
   Water soluble base: 0 to 20%
   Water: to 100%
   wherein said sulfite is selected from the group consisting of sodium sulfite and potassium sulfite;
   wherein said 1st polymer is selected from the group consisting of;
   wherein said carbonate is selected from the group consisting of sodium carbonate and potassium carbonate;
   wherein said polyhydroxy acid is selected from the group consisting of ascorbic acid and erythorbic acid.

2. The composition claimed in claim 1 wherein said first polymer has a molecular weight of 500–5000 and said polymaleate has a molecular weight of 500–1000.

3. The composition claimed in claim 2 wherein said first polymer is polymethacrylate.

4. The composition claimed in claim 1 wherein said sulfite is sodium sulfite and said carbonate is sodium carbonate.

5. The composition claimed in claim 1 wherein said polyhydroxy acid is ascorbic acid.

6. The composition claimed in claim 1 consisting of
   Composition: Concentration
   Sodium Glucoheptonate: 0.01 to 0.5%
   Sodium Sulfite: 1.0 to 10%
   Sodium Carbonate: 0.01 to 7%
   Ascorbic Acid: 0.1 to 5%
   Sodium polymethacrylate having a molecular weight of 500–5000: 0.1 to 4%
   Polymaleic acid having a molecular weight of 500–1000: 0.1 to 4%
   Diethylaminoethanol: 0.1 to 15%
   Sodium hydroxide: 10 to 20%
   Water: to 100%

* * * * *

UNITED STATES PATENT AND TRADEMARK OFFICE
CERTIFICATE OF CORRECTION

PATENT NO. : 4,874,541

DATED : October 17, 1989

INVENTOR(S) : Lyle H. Steimel and Ronald J. Christensen

It is certified that error appears in the above-identified patent and that said Letters Patent is hereby corrected as shown below:

At column 6, line 23, after "consisting of" please insert --polyacrylic acid, polymethacrylic acid and the sodium or potassium salts thereof; wehrein said polymaleate is polymaleic acid or the sodium or potassium salt thereof;--.

Signed and Sealed this

Twentieth Day of November, 1990

Attest:

HARRY F. MANBECK, JR.

*Attesting Officer*  *Commissioner of Patents and Trademarks*